(12) United States Patent
Bouanen et al.

(10) Patent No.: US 9,722,935 B2
(45) Date of Patent: Aug. 1, 2017

(54) SYSTEM AND METHOD FOR TRANSMISSION MANAGEMENT IN SOFTWARE DEFINED NETWORKS

(71) Applicant: Huawei Technologies Canada Co., Ltd., Kanata (CA)

(72) Inventors: Marwen Bouanen, Montreal (CA); Oscar Humberto Delgado Collao, Montreal (CA); Fabrice Labeau, Longueuil (CA); Alex Stephenne, Stittsville (CA); Ngoc Dung Dao, Ottawa (CA)

(73) Assignee: Huawei Technologies Canada Co., Ltd., Kanata (CA)

( * ) Notice: Subject to any disclaimer, the term of this patent is extended or adjusted under 35 U.S.C. 154(b) by 68 days.

(21) Appl. No.: 14/516,394

(22) Filed: Oct. 16, 2014

(65) Prior Publication Data

US 2016/0112335 A1  Apr. 21, 2016

(51) Int. Cl.
*H04W 4/00* (2009.01)
*H04L 12/825* (2013.01)
(Continued)

(52) U.S. Cl.
CPC ......... *H04L 47/263* (2013.01); *H04L 45/566* (2013.01); *H04L 47/2441* (2013.01); *H04L 47/30* (2013.01); *H04L 43/08* (2013.01)

(58) Field of Classification Search
None
See application file for complete search history.

(56) References Cited

U.S. PATENT DOCUMENTS 8,521,905 B2 *  8/2013  Beliveau ............... H04L 67/327
                                                    370/224
8,743,812 B2 *  6/2014  Yin ..................... H04W 76/025
                                                    370/252
(Continued)

FOREIGN PATENT DOCUMENTS

CN     102075984 A     5/2011
CN     103051629 A     4/2013
(Continued)

OTHER PUBLICATIONS

Kokku, et al., "NVS: A Substrate for Virtualizing Wireless Resources in Cellular Networks," IEEE/ACM Transactions on Networking, vol. 20, No. 5, Oct. 2012, pp. 1333-1346.
(Continued)

*Primary Examiner* — Anh-Vu Ly
(74) *Attorney, Agent, or Firm* — Slater Matsil, LLP

(57) ABSTRACT

A communications controller is provided. The communications controller includes a flow manager that classifies a packet flow serviced by more than one transmission points (TPs) as one of a plurality of slices in accordance with at least one of a nature of the packet flow, a load status of each of the plurality of slices, and feedback information provided by the more than one TPs, and alters a classification of the packet flow in accordance with the load status of each of the plurality of slices, and feedback information provided by the TPs served by the communications controller. The communications controller also includes a memory coupled to the flow manager, the memory stores a packet of the packet flow in one of a plurality of packet queues in accordance with the classification of the packet flow.

20 Claims, 10 Drawing Sheets

(51) Int. Cl.
  *H04L 12/721* (2013.01)
  *H04L 12/851* (2013.01)
  *H04L 12/835* (2013.01)
  *H04L 12/26* (2006.01)

(56) References Cited

U.S. PATENT DOCUMENTS

| | | |
|---|---|---|
| 2009/0006521 A1 | 1/2009 | Veal et al. |
| 2012/0002544 A1* | 1/2012 | Kokku ................ H04L 47/2441 370/232 |
| 2013/0156001 A1* | 6/2013 | Gomadam ........ H04W 72/0406 370/330 |
| 2013/0163426 A1* | 6/2013 | Beliveau ............... H04L 67/327 370/235 |
| 2014/0016501 A1 | 1/2014 | Kamath et al. |
| 2014/0307554 A1* | 10/2014 | Basso ................ H04L 47/2441 370/235 |
| 2015/0026794 A1* | 1/2015 | Zuk .................... H04L 63/0227 726/13 |
| 2015/0055623 A1* | 2/2015 | Li ........................ H04W 40/04 370/331 |
| 2015/0365323 A1* | 12/2015 | Duminuco ............ H04L 45/745 370/235 |

FOREIGN PATENT DOCUMENTS

| | | |
|---|---|---|
| CN | 103560963 A | 2/2014 |
| EP | 2765751 A1 | 8/2014 |

OTHER PUBLICATIONS

Kokku, et al., "CellSlice: Cellular Wireless Resource Slicing for Active RAN Sharing," IEEE Communication Systems and Networks (COMSNETS), 2013 Fifth International Conference, Jan. 7-10, 2013, pp. 1-10.

Mahindra, R., et al., "MESA: Farsighted Flow Management for Video Delivery in Broadband Wireless Networks," Communications Systems and Networks (COMSNETS), 2011 Third International Conference, Jan. 4-8, 2011, pp. 1-10.

* cited by examiner

SYSTEM AND METHOD FOR TRANSMISSION MANAGEMENT IN SOFTWARE DEFINED NETWORKS

TECHNICAL FIELD

The present disclosure relates generally to digital communications, and more particularly to a system and method for transmission management in software defined networks.

BACKGROUND

Software Defined Networks (SDNs) offer ease of development, as well as maintenance for network operators. Furthermore, SDNs allow for the isolation of experiments that execute concurrently on a single network. In general, SDNs feature a split data plane and control plane. The split data and control planes typically increase the scalability of the network, as well as ease of configuration.

SUMMARY OF THE DISCLOSURE

Example embodiments of the present disclosure which provide a system and method for transmission management in software defined networks (SDNs).

In accordance with an example embodiment of the present disclosure, a communications controller is provided. The communications controller includes a flow manager, and a memory operatively coupled to the flow manager. The flow manager classifies a packet flow serviced by more than one transmission points (TPs) as one of a plurality of slices in accordance with at least one of a nature of the packet flow, a load status of each of the plurality of slices, and feedback information provided by the more than one TPs, and alters a classification of the packet flow in accordance with the load status of each of the plurality of slices, and feedback information provided by the more than one TPs. The memory stores a packet of the packet flow in one of a plurality of packet queues in accordance with the classification of the packet flow.

In accordance with another example embodiment of the present disclosure, a method for operating a communications controller is provided. The method includes receiving, by the communications controller, a packet of a packet flow serviced by more than one transmission points (TPs) controlled by the communications controller, and classifying, by the communications controller, the packet flow as one of a plurality of slices in accordance with at least one of a nature of the packet flow, a load status of each of the plurality of slices, and feedback information provided by the more than one TPs. The method also includes storing, by the communications controller, the packet in one of a plurality of packet queues in accordance with the classification of the packet flow.

In accordance with another example embodiment of the present disclosure, a communications system is provided. The communications system includes a plurality of transmission points (TPs), and a communications controller operatively coupled to the plurality of TPs. The TPs serves user equipments. The communications controller classifies a packet flow serviced by more than one TPs of the plurality of TPs as one of a plurality of slices in accordance with at least one of a nature of the packet flow, a load status of each of the plurality of slices, and feedback information provided by the plurality of TPs controlled by the communications controller. The communications controller alters a classification of the packet flow in accordance with the load status of each of the plurality of slices, and feedback information provided by the plurality of TPs, and stores a packet of the packet flow in one of a plurality of packet queues in accordance with the classification of the packet flow.

One advantage of an embodiment is that dynamic adaptation of slices is provided. Therefore, the slices are adaptable dynamically to meet changing operating conditions, thereby helping to ensure that quality of service (QoS) requirements are met. Additionally, data rates of radio nodes are more balanced as operating conditions change.

A further advantage of an embodiment is that slice allocation and/or management techniques are provided for situations where multiple evolved NodeBs (eNB) transmit to a single user equipment (UE).

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to transmission management in software defined networks (SDNs). For example, a communications controller receives a packet of a packet flow serviced by more than one transmission points (TPs), classifies the packet flow as one of a plurality of slices in accordance with at least one of a nature of the packet flow, a load status of each of the plurality of slices, and feedback information provided by the more than one TPs, and stores the packet in one of a plurality of packet queues in accordance with the classification of the packet flow.

The present disclosure will be described with respect to example embodiments in a specific context, namely SDN networks that deliver video content to UEs. The disclosure may be applied to standards compliant communications systems, including heterogeneous communications systems (HetNets), such as those that are compliant with Third Generation Partnership Project (3GPP), IEEE 802.11, and the like, technical standards, and non-standards compliant communications systems, that deliver QoS constrained content to UEs.

Figure 1:
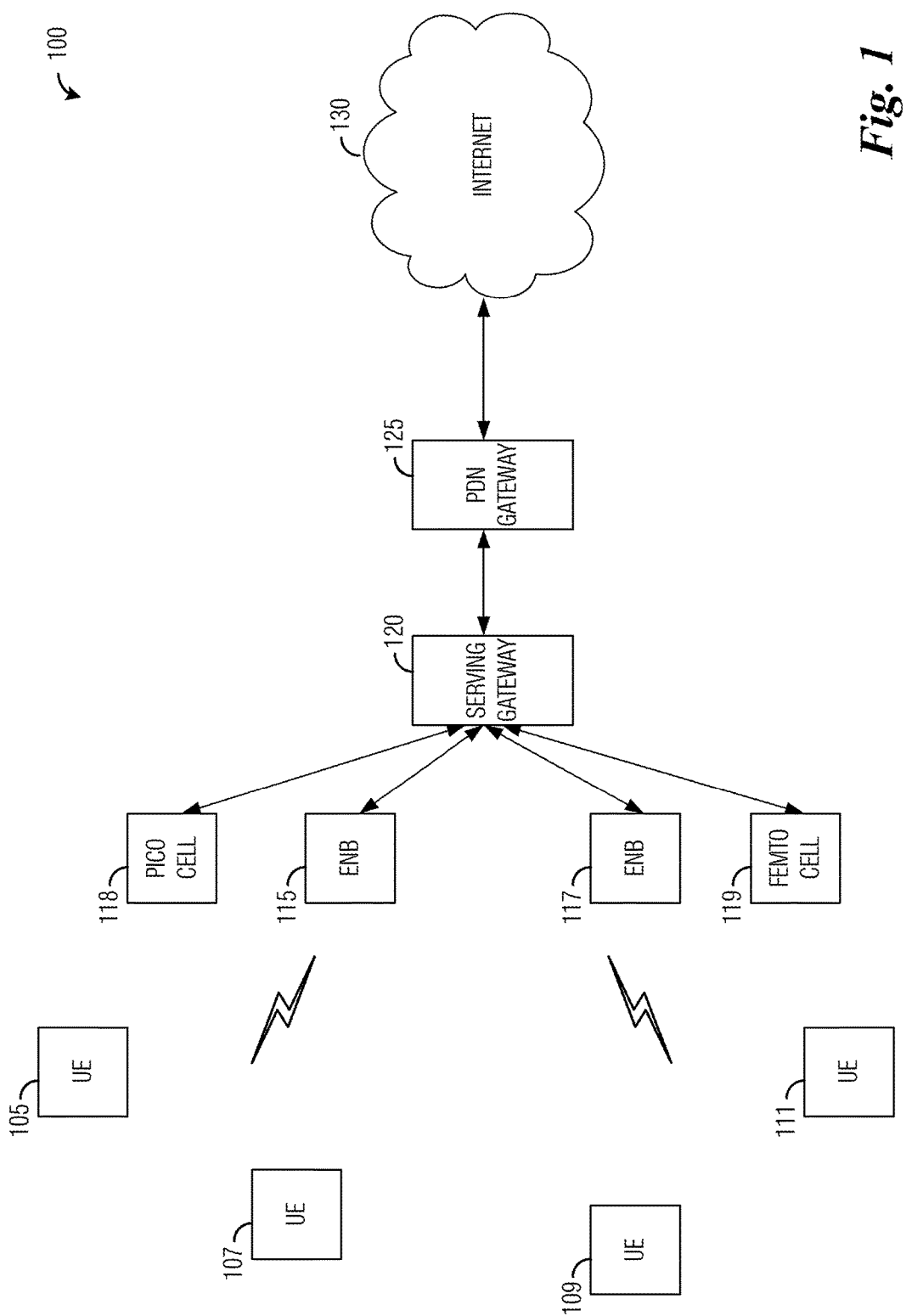
FIG. 1 illustrates a first example communications system according to example embodiments described herein.

FIG. 1 illustrates a first example communications system 100. Communications system 100 includes a plurality of user equipments (UEs), such as UE 105, UE 107, UE 109, and UE 111. The UEs in the plurality of UEs may be served by one or more evolved NodeBs (eNBs), such as eNB 115 and eNB 117. The UEs in the plurality of UEs may also be served by one or more pico cells, such as pico cell 118, as well as femto cells, such as femto cell 119. The eNBs, pico cells, femto cells, and the like, may provide radio access to the UEs. In general, communications from a UE or to a UE goes through one or more eNBs, pico cells, femto cells, and the like. In some special operating modes, UEs may be able to directly communicate with one another without having an eNB (or pico cell or femto cell) serve as intermediary.

eNBs, pico cells, femto cells, and UEs are terms used to describe some devices in a 3GPP Long Term Evolution (LTE) communications systems, other terms may be used in different communications systems. As an illustrative example, eNBs may also be commonly referred to as base stations, access points, NodeBs, controllers, base station transceiver systems, and the like, while UEs may also be commonly referred to as mobile stations, mobiles, stations, users, subscribers, terminals, and the like. Although the discussion focuses on eNBs, the example embodiments presented herein are operable with other radio access devices, such as remote radio heads, eNB sectors, pico cells, femto cells, access points, and the like (in general, these devices may be referred to as transmission points (TPs)), as well as other radio access technologies, such as IEEE 802.11, Wi-Fi, BlueTooth, WiMAX, and the like. Therefore, the focus on eNBs and LTE should not be construed as being limiting to either the scope or the spirit of the example embodiments.

The TPs, e.g., eNBs, pico cells, femto cells, and the like, may be connected to a serving gateway 120, which may be referred to generically as a local anchor. Serving gateway 120 may typically handle mobility and user session management. A packet data network gateway (PDN gateway) 125 may connect serving gateway 120 to an Internet Protocol (IP) network, such as the Internet 130. PDN gateway 125 may also handle QoS policies and/or billing functions. In a WiMAX communications system, the gateways may be referred to as application service network gateway (ASN) and content service network gateway (CSN).

While it is understood that communications systems may employ multiple TPs (e.g., eNBs, pico cells, femto cells, and the like) capable of communicating with a number of UEs, only four TPs (2 eNBs, 1 pico cell, and 1 femto cell), and a number of UEs are illustrated for simplicity.

According to an example embodiment, the SDN architecture in conjunction with wireless access offers value-added wireless video transmission services to video content providers. The SDN architecture enables the use of a centralized control plane that is able to control different access technologies. Any given UE may be served by one or more TPs, potentially using different radio access technologies, including but not limited to LTE, Wi-Fi, WiMAX, Bluetooth, and the like.

It is noted that although the discussion focuses on video transmission and video content delivery, the example embodiments discussed herein are operable with other forms of content transmission, especially content that has QoS constraints, performance sensitivity, and the like. Examples of such content may include voice, health monitoring, emergency monitoring, and the like.

Figure 2:
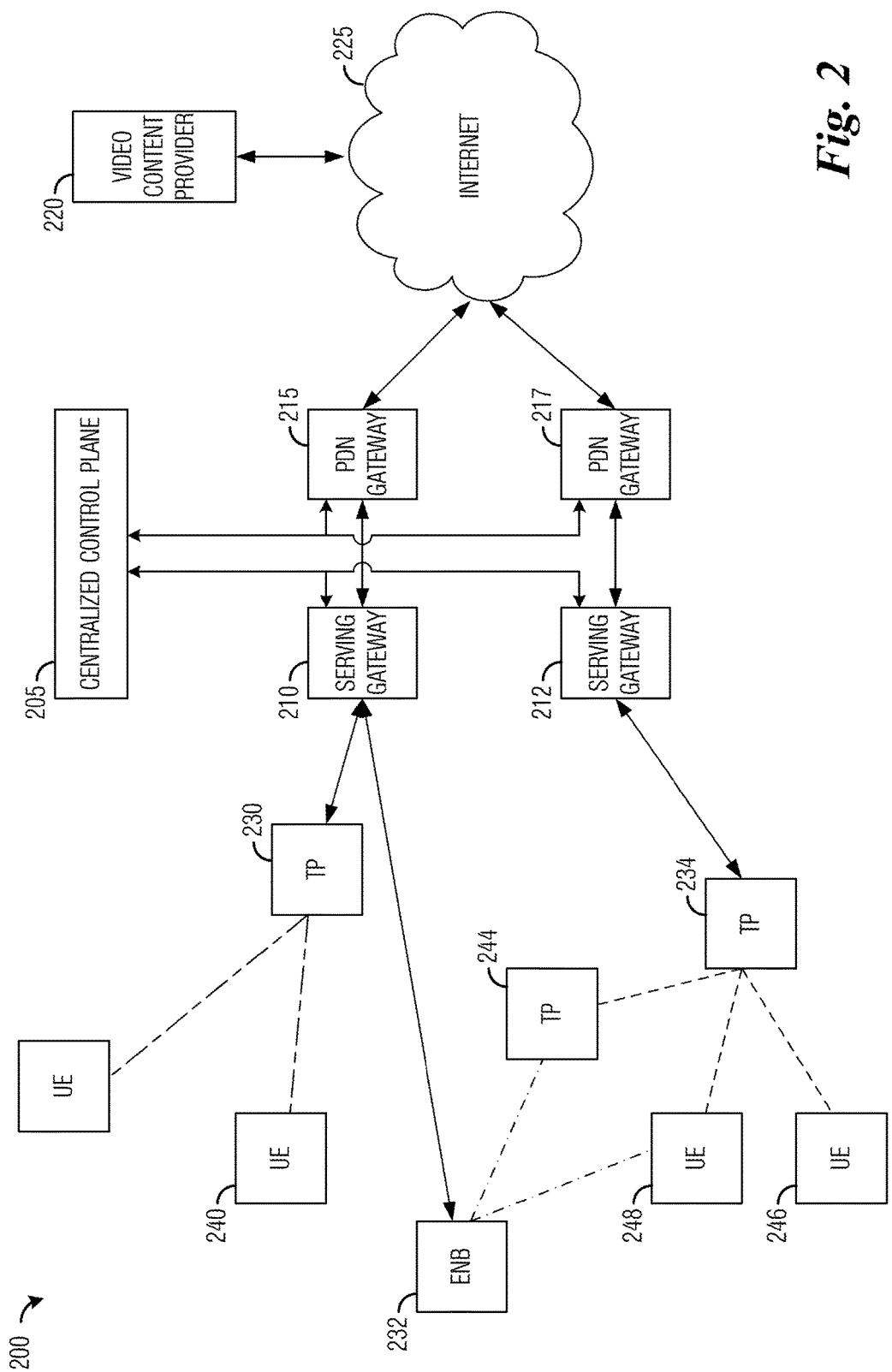
FIG. 2 illustrates a second example communications system according to example embodiments described herein.

FIG. 2 illustrates a second example communications system 200. Communications system 200 includes a centralized control plane 205, that among other things, performs flow level management that typically establishes a list of actions to be taken for each flow matching a particular rule, and virtualizes network resources through slicing and enables the coexistence of multiple types of services or operators with different routing and/or policies on a single physical infrastructure.

Centralized control plane 205 may be coupled to serving gateways (such as serving gateways 210 and 212) and PDN gateways (such as PDN gateways 215 and 217). Centralized control plane 205 may specify the distribution of packets from a video content provider 220 that is connected to the PDN gateways and the serving gateways through Internet 225. The distribution of packets from video content provider 220, as well as packets from other services, may be specified by the classification of flows (e.g., video flows), as well as operating conditions of communications system 200 (including load status of video flow queues, TP load, UE load, channel condition, and the like).

The packets from video content provider 220 (as well as packets from other services) may be provided to TPs (such as TPs 230-234) for delivery to UEs (such as UEs 240-248). Centralized control plane 205 may specify which TPs receive which video packets. As an illustrative example, a TP that is not serving any UE subscribed to a specified video flow is unlikely to receive any packets associated with the specified video flow. As another illustrative example, if two (or more) TPs are cooperating to serve a video flow to a UE, then the TPs involved will be provided with packets associated with the video flow for delivery to the UE.

Figure 3:
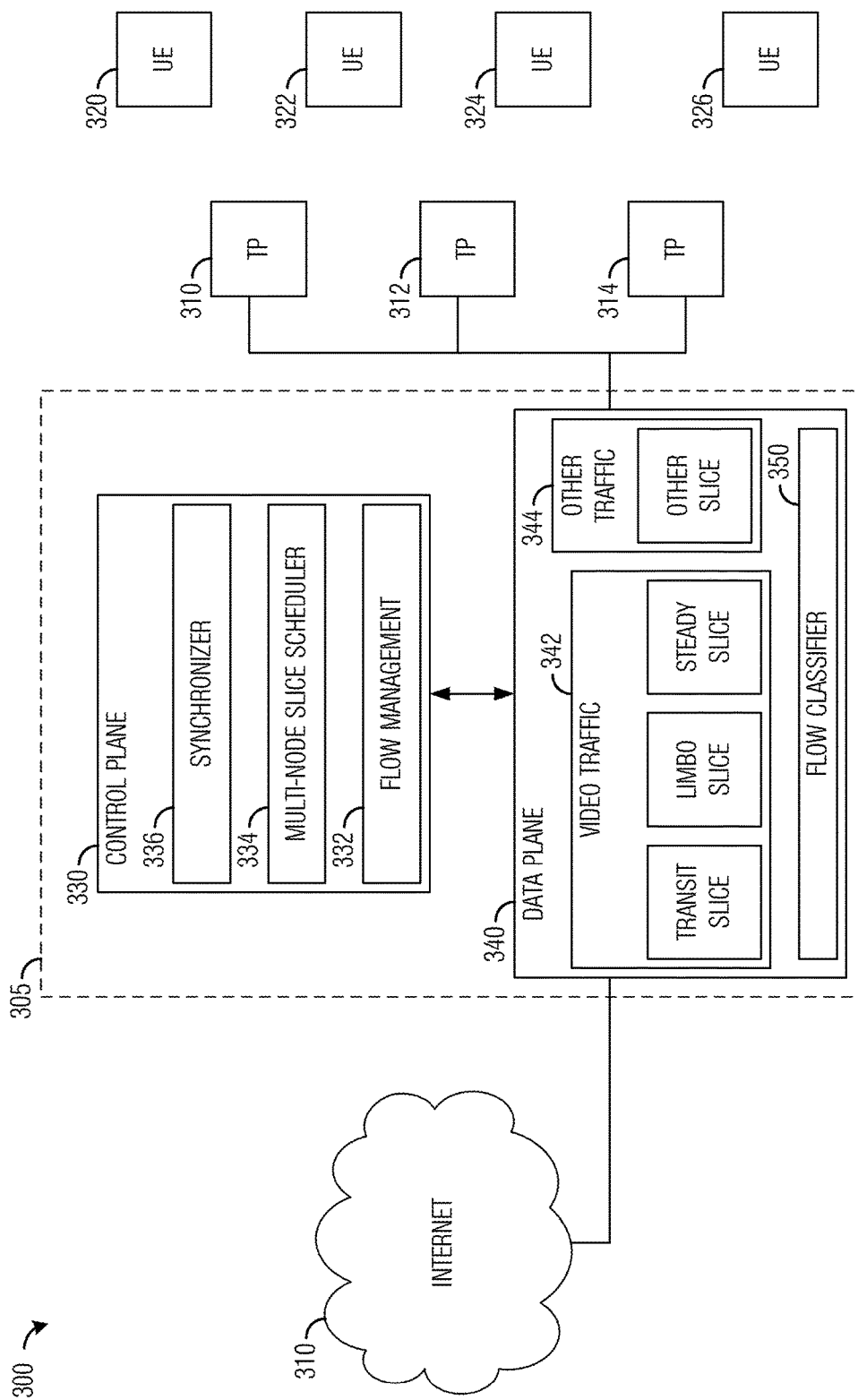
FIG. 3 illustrates a third example communications system highlighting a logical view of a joint slice management (JSM) unit according to example embodiments described herein.

FIG. 3 illustrates a third example communications system 300 highlighting a logical view of a joint slide management (JSM) unit. Communications system 300 includes a JSM unit 305 (shown in a logical form) that may be coupled in between an Internet 310 and a plurality of TPs (such as TPs 310-314) that are serving a plurality of UEs (such as UEs 320-326).

According to an example embodiment, JSM unit 305 may operate as a centralized controller that jointly handles flow admission control (e.g., classification of packet flows, queuing and/or dropping of packet flows, and the like) and scheduling of packet transfers, as well as other operations. JSM unit 305 may take advantage of SDN architecture that splits the data plane and the control plane, mainly to virtualize the wireless access network and to allow for differentiated services for packet traffic, such as for video packet traffic. As a result, JSM unit 305 may be able to handle UEs simultaneously connected to multiple eNBs. JSM unit 305 may group packet flows with similar characteristics into slices within the data plane. JSM unit 305 may manage wireless resource allocation procedures across slices, as well as multiple TPs, using the control plane.

In general, JSM unit 305 may be capable of handling packets for UEs connected to multiple TPs. QoS restrictions, such as minimum offered rate, maximum tolerable delay, and the like, are set between UEs and communications operators. Hence, JSM unit 305 may not be involved with specifying QoS restrictions. However, operation of JSM unit 305 may be determined based on the QoS restrictions. Furthermore, the TPs may provide periodic feedback to JSM unit 305. The periodic feedback may include: TP utilization (a number of network resources used for packet transmission and a total number of available slots), currently used modulation and coding scheme (MCS) for each UE, and a signal to interference plus noise ratio (SINR) for each UE. JSM unit 305 may take the feedback information into consideration as it controls the packet flow to the UEs through the TPs.

JSM unit 305 may virtualize and support multiple TPs, multiple radio access technologies (RATs), as well as multiple frequency bands. JSM unit 305 may also dynamically adapt allocated resources of slices according to an optimization framework with an aim to maximize utility functions of the slices while trying to ensure that QoS restrictions are met. Furthermore, JSM unit 305 may also balance the packet traffic between adjacent TPs in order to avoid congestion, while maximizing TP utilization. Additionally, JSM unit 305 may increase the quality of experience (QoE) for UEs by minimizing dropped packets.

JSM unit 305 may include a control plane 330 and a data plane 340. Control plane 330 may be an example implementation of logically centralized control plane 205 of FIG. 2, while data plane 340 may be a logical representation of a serving gateway(s) and a PDN gateway(s). Control plane 330 may include a flow management unit 332 configured to implement a migration strategy, which controls changes in the classification of a video flow. According to an example embodiment, the migration strategy takes into consideration information such as video flow classification, slice status (e.g., slice load, slice queue size, and the like), TP status (e.g., TP capacity, channel capacity, channel condition, and the like), performance metrics, and the like, to change the classification of a video flow. Detailed discussion of example migration strategies are provided below. Control plane 330 may also include a multi-node slice scheduler 334 and a synchronizer 336. Multi-node slice scheduler 334 may be configured to schedule the transfer of packets of video flows from data plane 340 to TPs. Although referred to as a multi-node scheduler, multi-node slice scheduler 334 may operate in situations where single TPs are serving UEs as well as situations where multi-TPs are serving UEs. Synchronizer 336 may be configured to coordinate the operations of data plane 340, e.g., serving gateway(s) and PDN gateway(s).

Logically, data plane 340 may include a plurality of packet queues, such as video traffic queues 342, as well as other traffic queues 344. As an illustrative example, if video flows are classified into one of three possible video slices, then video traffic queues 342 may include three separate video queues. It is noted that although shown in FIG. 3 as including three video queues, video traffic queues 342 may include a different number of video queues, generally one video queue for each video slice. However, for video slices with relatively light packet traffic, it may be possible to use a single video queue for more than one video slice. It is also noted that although shown in FIG. 3 as a single queue, other traffic queues 344 may include a different number of queues, typically one queue for each different classification of other traffic although a single queue may be used for more than one classification of other traffic. Data plane 340 may also include a flow classifier 350. Flow classifier 350 may direct packets of packet flows to a packet queue associated with the packets. As an illustrative example, data plane 340 may direct packets of video flows to a video queue in video traffic queues 342 and packets of other packet flows to other traffic queues 344.

As discussed previously, data plane 340 may be a logical representation of serving gateway(s) and PDN gateway(s). Therefore, the packet queues may be implemented in the serving gateway(s) only, the PDN gateway(s) only, or a combination of the serving gateway(s) and the PDN gateways. Additionally, in an example implementation wherein data plane 340 is implemented over multiple serving gateways and PDN gateways, the packet queues may be implemented over the multiple serving gateways and PDN gateways. Alternatively, a serving gateway and PDN gateway may implement a particular packet queue only if a UE associated with them is receiving packets associated with the particular queue. As an illustrative example, if a UE is receiving a first video flow, then the serving gateway and PDN gateway associated with a TP serving the UE may implement the video queue associated with the first video flow.

Although shown in FIG. 3 as including a single JSM unit, a communications system may include more than one JSM unit. As an illustrative example, different JSM units may be implemented in different geographical areas of the communications system. As another illustrative example, different JSM units may be implemented to manage different types of packet flows. As yet another illustrative example, different portions of the communications may be managed by different JSM units with each JSM unit potentially managing traffic flows in different ways.

Figure 4:
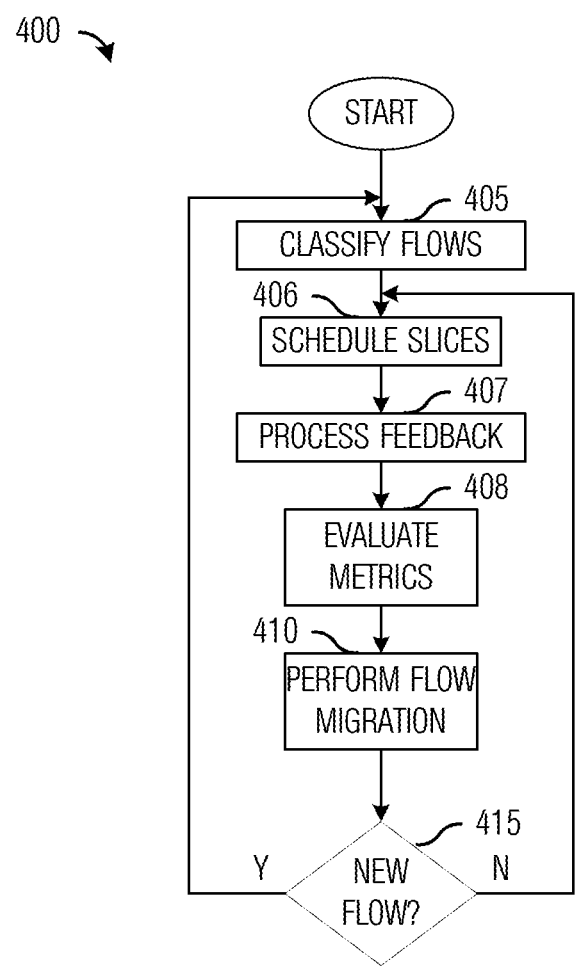
FIG. 4 illustrates a flow diagram of example operations occurring in a JSM unit as the JSM unit manages traffic flows according to example embodiments described herein.

FIG. 4 illustrates a flow diagram of example operations 400 occurring in a JSM unit as the JSM unit manages traffic flows. Operations 400 may be indicative of operations occurring in a JSM unit, such as JSM unit 305, as the JSM unit manages traffic flows.

Operations 400 may begin with the JSM unit classifying traffic flows (block 405). The JSM unit may utilize a flow management unit, such as flow management unit 332, to classify traffic flows. The JSM unit may classify traffic flows, e.g., video flows, into one or more types in accordance with classification criteria, which may include duration of flow, video flow data rate, available communications system resources (e.g., buffer space, transmission resources, and the like), video flow priority, and the like. As an illustrative example, the JSM unit may classify traffic flows into one of four different slices (types): one of three video slices (a transit slice, a limbo slice, and a steady slice) or another slice (which may be catch-all for other types of traffic flows in the communications system). In general, new video flows are classified as transit slice. However, if the transit slice video queue is overloaded, the video flow may be temporarily classified as limbo slice. Furthermore, if there is not sufficient capacity in the limbo slice video queue, the packets associated with the video flow may be discarded. It is noted that in different example implementations, there may be different numbers of slices. As an illustrative example, there may be more than 3 video slices or less than 3 video slices. Also, there may be multiple other slices for types of traffic flows that are not video flows.

The JSM unit may also schedule slices (block 406). As the packets of the various packet flows are received in the data plane of the JSM unit, they may be queued in corresponding packet queues. The JSM unit may dequeue packets from the packet queues and forward the packets to respective TPs for transmission to UEs. A multi-node slice scheduler, such as multi-node slice scheduler 334, may perform the dequeuing and forwarding of packets. According to an example embodiment, the JSM unit may dequeue packets from packet queues in such a way as to ensure that the number of transmission resources used to transmit the packets meet a specified ratio. As an illustrative example, the specified ratio may be expressed as St:Ss:So, where St specifies the number of transmission resources used for transit slice packets, Ss specifies the number of transmission resources used for steady slice packets, and So specifies the number of transmission resources used for other slice packets. The number of transmission resources used by each packet may be determined as a ratio of packet size in bytes and a current transmission bit rate of the channel (as specified by the MCS of the channel). It is noted that transit slice packets, steady slice packets, and other slice packets receive priority over limbo slice packets during scheduling and that limbo slice packets are scheduled only if there are no transit slice packets.

According to an example embodiment, the JSM unit may implement different and independent resource management mechanisms for each slice. As an illustrative example, a weighted fair scheduling technique based on the size of the packet flows for the transit slice and the steady slice may be used, while the limbo slice packets may be scheduled using shortest job first scheduling with higher priority being potentially given to important packets (e.g., I frames in H.264 video coding). The use of independent scheduling mechanisms may maximize the probability of packet delivery by defining suitable scheduling techniques for different slices.

The multi-node slice scheduler may not only decide on the scheduling order of the slices, but it may also determine on which interface (i.e., which radio access technology) the packets should be transmitted. The multi-node slice scheduler may also ensure that TP scheduling does not interfere with the JSM unit's own scheduling mechanism. As an example, the multi-node slice scheduler may control implicitly the work of TP scheduling by starving its packet buffers so that its own scheduling algorithms do not have to be used. The JSM unit may use utilization information provided by the TPs.

The JSM unit may receive and process feedback from TPs (block 407). As discussed previously, the JSM unit may receive feedback information, including utilization information, queue status, channel condition information, MCS information, and the like, from the TPs. The JSM unit may use the feedback information to adjust its slice scheduling.

The JSM unit may evaluate performance metrics (block 408). The JSM unit may evaluate one or more metrics for use in adjusting the configuration of the JSM unit. Examples of the metrics may include delay (e.g., end to end delay), drops (e.g., frame drops, packet drops, and the like), corruption (e.g., corrupted frames, corrupted packets, and the like), re-buffering (e.g., a measure of the amount of freezing time when a particular video flow is displayed), frame rate deviation (e.g., deviation of a video flow's actual frame rate from a pre-defined frame rate), and the like. The values of the metrics may be used in flow migration (reclassification) as discussed below.

Figure 5:
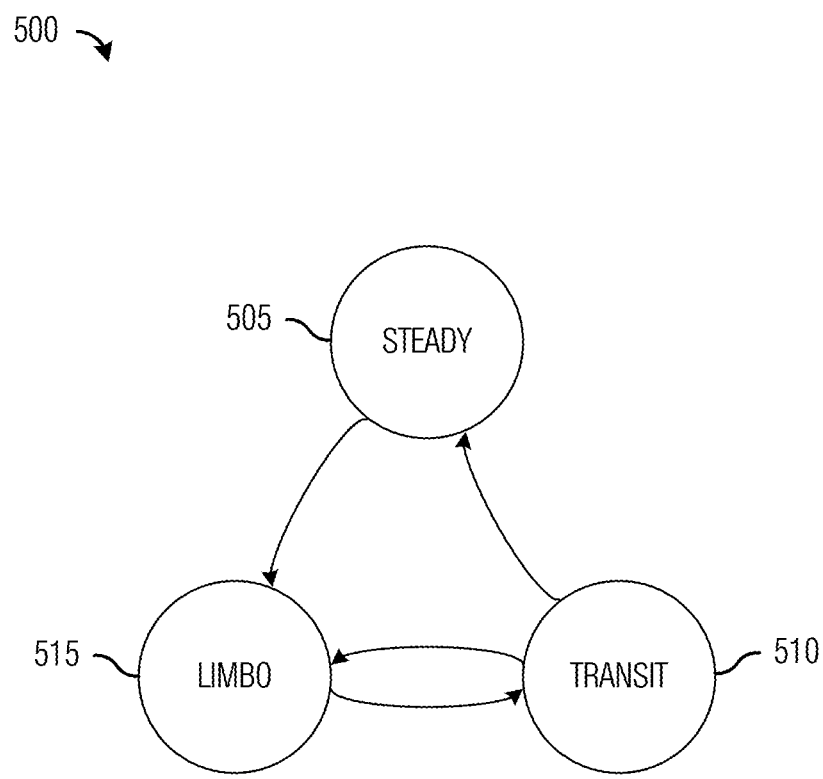
FIG. 5 illustrates an example classification state diagram according to example embodiments described herein.

The JSM unit may perform flow migration (reclassification) (block 410). It may be necessary or advantageous to change the classification of a packet flow. The changing of the classification of a packet flow may be performed to meet changed conditions, such as overloaded packet queues, underloaded packet queues, TP utilization, and the like. FIG. 5 illustrates an example classification state diagram 500. Classification state diagram 500 may include three states: steady slice 505, transit slice 510, and limbo slice 515. As shown in FIG. 5, a packet flow classified as a transit slice may be reclassified as a steady slice or a limbo slice. Similarly, a packet flow classified as a steady slice may be reclassified as a limbo slice, while a packet flow classified as a limbo slice may be reclassified as a transit slice. Detailed discussions of example reclassifications of packet flow classification are presented below.

Figure 6:
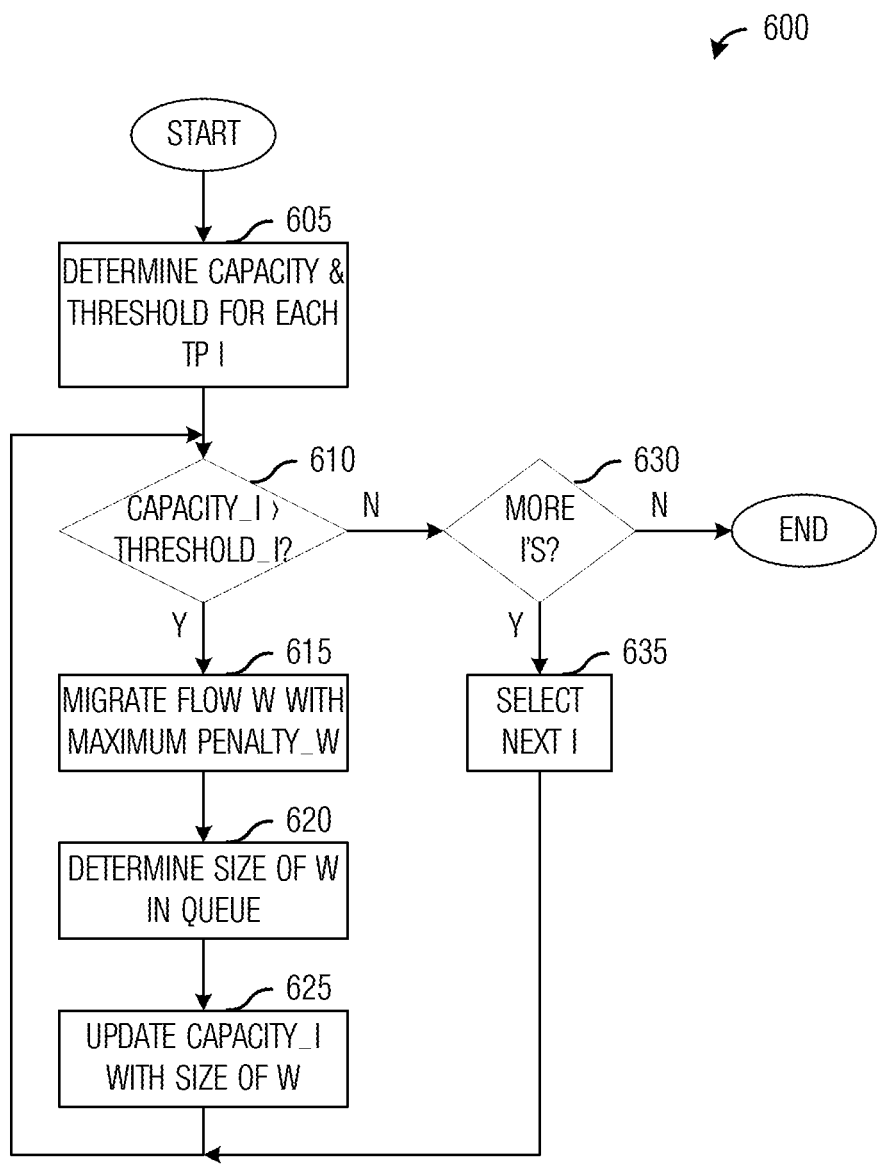
FIG. 6 illustrates a flow diagram of example operations occurring in a JSM unit in reclassifying a packet flow from transit slice to limbo slice according to example embodiments described herein.

FIG. 6 illustrates a flow diagram of example operations occurring in a JSM unit in reclassifying a packet flow from transit slice to limbo slice. Operations 600 may be indicative of operations occurring in a JSM unit, such as JSM unit 305, as the JSM unit reclassifies a packet from transit slice to limbo slice. Operations 600 may be scheduled to be performed periodically, such as once every $\theta_1$ units of time.

Operations 600 may begin with the JSM unit determining a capacity $C_i$ and threshold $T_i$ for each TP i (block 605). For a given packet flow w, the capacity $C_i$ may account for the capacity of flows $F_w$ in the transit slice associated with the UE connected to TPi plus a proportion of the capacity of flows $F_w$ connected to multiple TPs, which may be expressed mathematically as:

$$C_i = \Sigma_{i, w \in i} F_w + \Sigma_{j, w \notin j, j \neq i} F_w/2.$$

The threshold $T_i$ may be calculated as a moving average of bytes served in the transmission of slice $R_t$, which may be expressed mathematically as:

$$T_i = \text{delay}^{max} \times R_t.$$

Then, for an initial i (e.g., i=0), the JSM unit may perform a check to determine if capacity $C_i$ is greater than threshold $T_i$ (block 610). In other words, the JSM unit is determining if the capacity of the flows for TPi is greater than the threshold for TPi. If capacity $C_i$ is greater than threshold $T_i$, the JSM unit may migrate (reclassify) a flow w with maximum penalty metric $P_w$ from transit slice to limbo slice (block 615). As an example, the penalty metric may be a function of actual bit rate $R_w$ of flow w and an average delay $\text{delay}_w$ of flow w, which may be expressed mathematically as:

$$P_w = \frac{\text{delay}_w}{R_w}.$$

In general, the numerator of $P_w$ (i.e., the average delay $\text{delay}_w$) indicates that higher delays are less likely to be served until channel condition improves, ensuring that during overloaded conditions, UE with better channel condition may be preferred over UE with poor channel condition. The denominator of $P_w$ indicates that flows with higher bit rates receive better treatment.

Another way to migrate a packet flow to the limbo slice is when packets of the packet flow reach their maximum delay. In such a situation, packets are migrated to the limbo slice with an expectation that they will be served if there are enough resources. These packets may be dropped by time-out if their delay is greater than $\theta_2$.

The JSM unit may determine the size of flow w, $B_w$ (block 620) and update the capacity $C_i$ (block 625). As an illustrative example, the JSM unit may subtract the size of flow w from the capacity $C_i$. The JSM unit may continue to migrate (reclassify) flows until the capacity $C_i$ is no longer greater than threshold $T_i$ by returning to block 610. The JSM unit may perform a check to determine if there are any more TPs for which it has not perform flow migration (block 630). If there are more TPs, the JSM unit may select a next i (e.g., increment i) and return to block 610. If there are no more TPs, operations 600 may terminate.

Similarly, a packet flow may be reclassified from a transit slice to a steady slice if the packet flow is active for $\theta_3$ units of time. If there insufficient capacity, the packet flow may be rejected.

Additionally, a packet flow may be reclassified from a limbo slice to a transit slice if the packet flow was originally a transit slice and was reclassified as a limbo slice and if the transit slice is not overloaded. If the transit slice is overloaded, the packet flow remains a limbo slice. This reclassification may occur every $\theta_4$ units of time.

Furthermore, a packet flow may be reclassified from a steady slice to a limbo slice if a packet from the packet flow that is already being served in the steady slice and does not gain access to the steady slice because the steady slice is overloaded (temporarily). The packet flow may be migrated to the limbo slice. If there is insufficient capacity in the limbo slice, the packet flow may be discarded.

Returning now to FIG. 4, the JSM unit may perform a check to determine if it is receiving a new (e.g., unclassified) packet flow (block 415). If the JSM unit is receiving a new packet flow, the JSM unit may return to block 405 to classify the new packet flow. If the JSM unit is not receiving a new packet flow, the JSM unit may return to block 406 to schedule slices.

Figure 7:
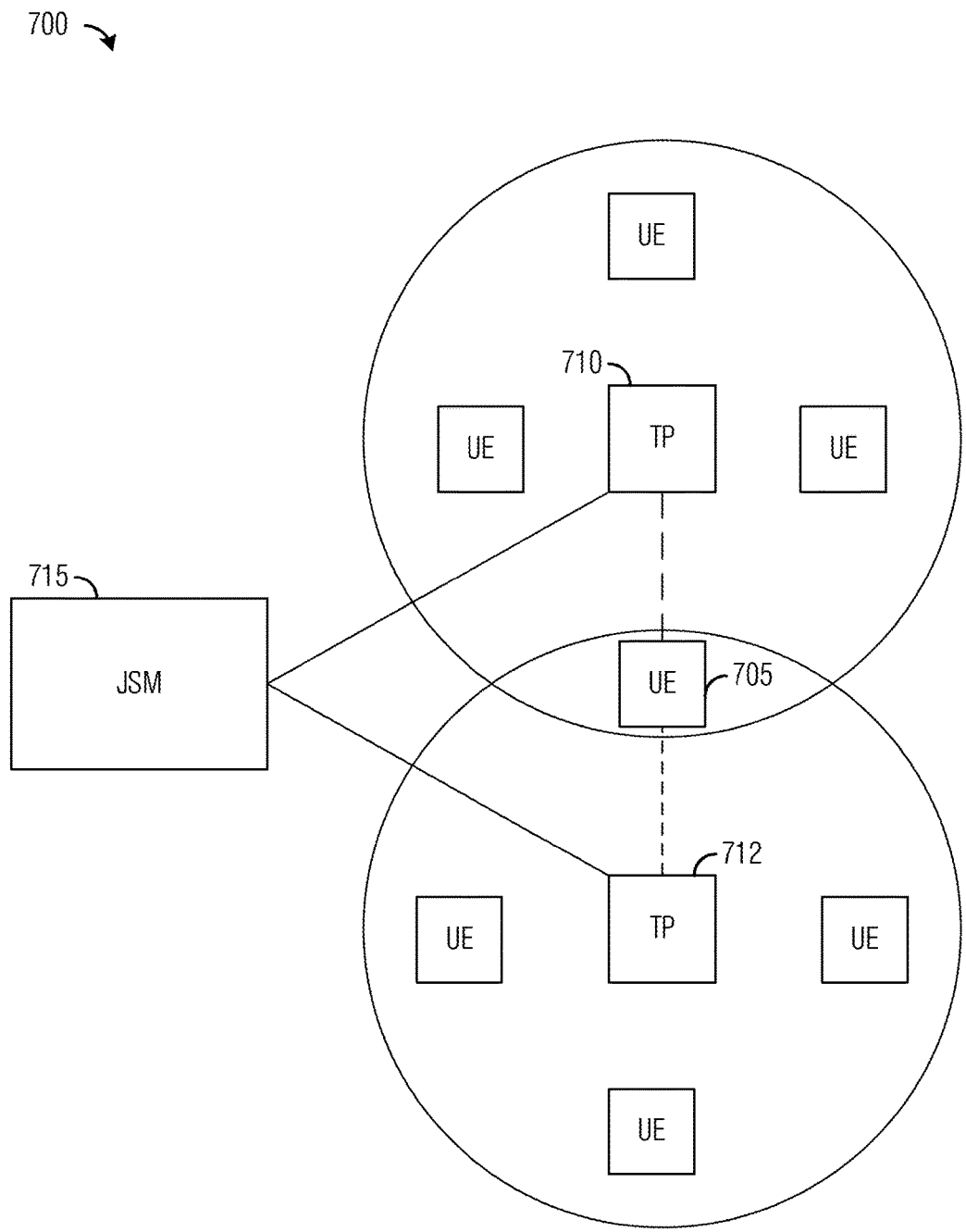
FIG. 7 illustrates an example communications system highlighting UEs simultaneously connected to multiple eNBs according to example embodiments described herein.

FIG. 7 illustrates an example communications system 700 highlighting UEs simultaneously connected to multiple TPs. As discussed previously, a situation wherein UEs are simultaneously connected to multiple TP is an important scenario to consider. In such a situation, resource allocation across multiple TPs while maximizing overall QoE for the UE is an important consideration. As shown in FIG. 7, a UE 705 may be operating within coverage areas of TP 710 and TP 712. Therefore, UE 705 may be connected to both TP 710 and TP 712.

Both TP 710 and TP 712 are managed by a JSM unit 715. JSM unit 715 controlling both TPs enables the possibility of jointly optimizing the scheduling of packet flows at the TPs, yielding potentially advantageous results. JSM unit 715 is capable of handling two or more TPs and efficiently admits and assigns network resources across multiple interfaces.

Another situation where a single UE may be simultaneously connected to multiple TPs is when the UE is operating within a coverage area of an eNB and it is also connected to a pico cell or a femto cell or is connected to a Wi-Fi access point. In such a situation, a JSM unit may also manage both TPs and enable joint optimization of the scheduling of packet flows to the UE.

Figure 8:
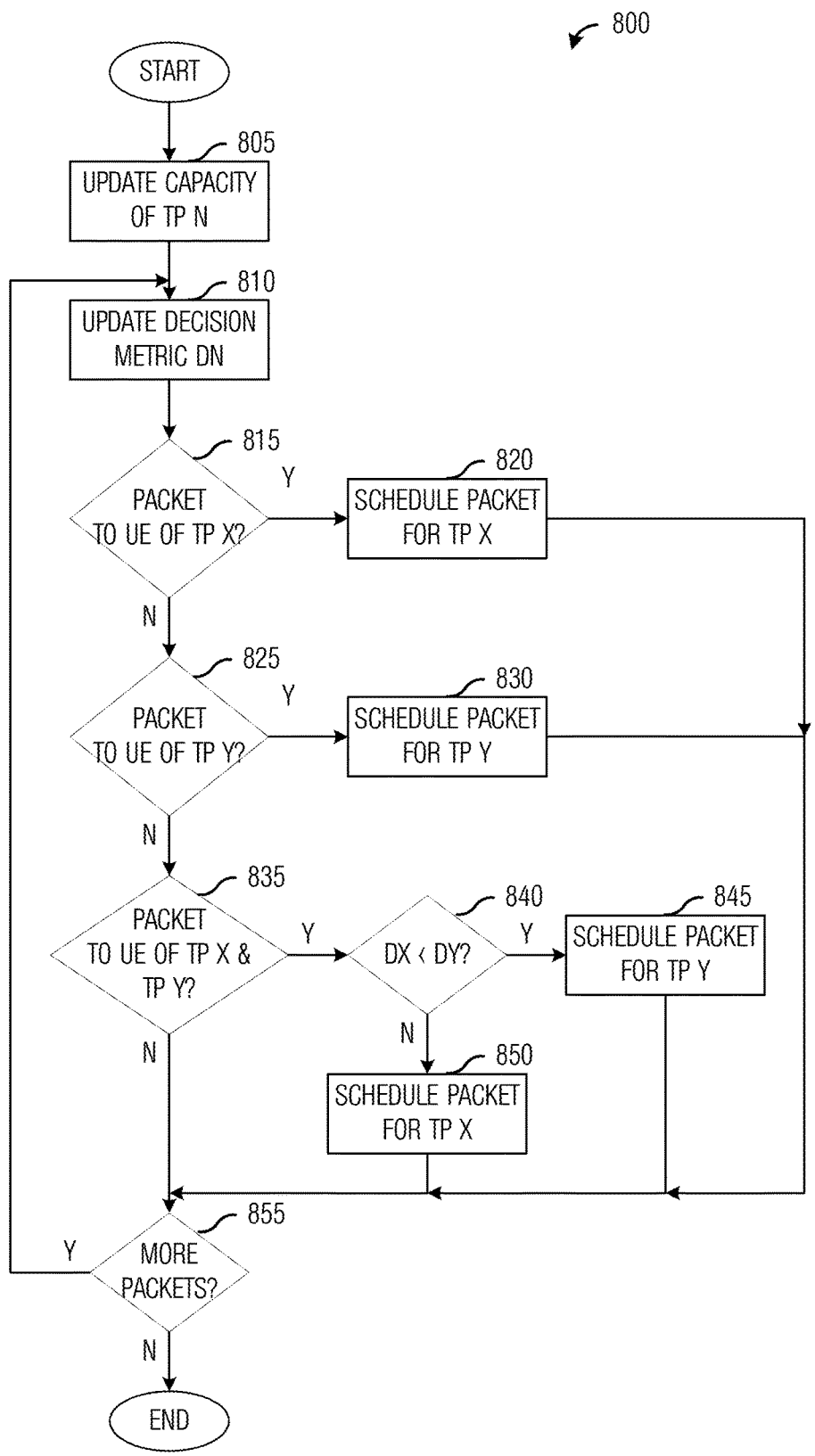
FIG. 8 illustrates a flow diagram of example operations occurring in a JSM unit as the JSM unit schedules network resources in a multiple eNB situation according to example embodiments described herein.

FIG. 8 illustrates a flow diagram of example operations 800 occurring in a JSM unit as the JSM unit schedules network resources in a multiple TP scenario. Operations 800 may be indicative of operations occurring in a JSM unit, such as JSM unit 305, as the JSM unit schedules network resources in a situation where multiple TPs are serving a single UE.

Operations 800 may begin with the JSM unit updating a capacity of TPn, $Cap_n$ (block 805). The JSM unit may update the capacity every $\delta$ units of time, for example. An example capacity may be expressed mathematically as:

$$Cap_n = \frac{1}{|W_n|}\sum_w Cap_w,$$

$n \in N,$ $w \in W_n,$ where N is the set of TPs, $W_n$ is the set of packet flows served by TPn, and $Cap_n$ is the total achievable rate of TPn in terms of bits per second. $R_n$ is the total average served rate of TPn.

The JSM unit may update a decision metric $D_n$ for TPn (block 810). In general, the decision metric may be updated for each packet that is to be scheduled by the JSM unit. An example decision metric may be expressed mathematically as:

$$D_n = \frac{Cap_n}{R_n},$$

where $R_n$ is the total average served rate of TPn.

For a given packet, the JSM unit may select a TP to serve the packet. In general, if the packet's destination is served by a single TP, the JSM unit assigns the TP to serve the packet. However, if the packet's destination is served by multiple TPs, the JSM unit assigns the TP based on the decision metric values of the multiple TPs. The JSM unit may perform a check to determine if the packet is destined for a UE served only by a first TP, TPx (block 815). If the UE is served only by the first TP, the JSM unit schedules the packet to the first TP, TPx (block 820) and moves to block 855 to perform a check to determine if there are additional packets to schedule. The JSM unit may perform a check to determine if the packet is destined for a UE served only by a second TP, TPy (block 825). If the UE is served only by the second TP, the JSM unit schedules the packet to the second TP, TPy (block 830) and moves to block 855 to perform a check to determine if there are additional packets to schedule.

If the UE is not served by only one TP, the JSM unit may perform a check to determine if the UE is served by two TPs, TPx and TPy (block 835). If the UE is served by both the first TP and the second TP, the JSM unit may perform a check to determine if the decision metric for TPx, $D_x$, is less than the decision metric for TPy, $D_y$ (block 840). If the decision metric TPx, $D_x$, is less than the decision metric for TPy, $D_y$, the JSM unit may schedule the packet to the second TP, TPy (block 845) and moves to block 855 to perform a check to determine if there are additional packets to schedule. If the decision metric TPx, $D_x$, is not less than the decision metric for TPy, $D_y$, the JSM unit may schedule the packet to the first TP, TPx (block 850) and moves to block 855 to perform a check to determine if there are additional packets to schedule. Although operations 800 illustrates a situation wherein a UE is served by two TPs, the example embodiments presented herein are also operable in situations where UEs are served by different numbers of TPs, such as three TPs, four TPs, five TPs, and the like.

The JSM unit may perform a check to determine if there are any additional packets to schedule (block 855). If there are more packets to schedule, the JSM unit may return to block 810 to update the decision metric and schedule additional packets.

The size of a slice (e.g., a percentage of resources, such as buffer space, allocated to a slice) may have a significant impact on the ability of the communications system to meet QoS requirements, as well as achieve QoE targets of the users. As an illustrative example, if a slice is too small (e.g., the percentage of resources allocated to the slice is small), too many packets may be dropped, yielding a low slice rate, large number of dropped frames or packets, poor quality video, and the like.

According to an example embodiment, the JSM unit performs dynamic adaptation of slice sizes. The JSM unit dynamically adapts the slice sizes using a rate-based utility with constraints on rate, resource balancing between multiple TPs, user QoE, and the like. A slice size may be the rate allocated to the slice after performing the optimization. Weights may be defined for each slice in accordance with an averaged slice rate, a moving average of slice rate, a rate threshold based on QoE targets and/or loss rate ratios between packets, and the like. The dynamic adaptation of slice sizes may occur periodically (e.g., at specified intervals), when a performance metric is met (such as a frame drop rate, an average slice rate, a QoE target, and the like), when a request to perform dynamic adaptation is received, and the like.

Figure 9:
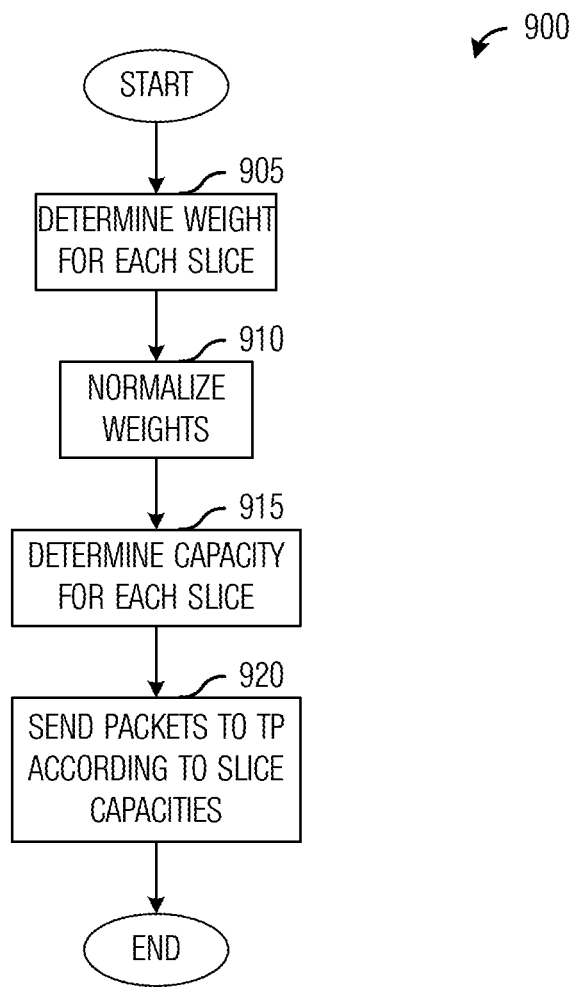
FIG. 9 illustrates a flow diagram of example operations occurring in a JSM unit as the JSM unit dynamically adjusts slice sizes in a single eNB situation according to example embodiments described herein.

FIG. 9 illustrates a flow diagram of example operations 900 occurring in a JSM unit as the JSM unit dynamically adjusts slice sizes in a single TP situation. Operations 900 may be indicative of operations occurring in a JSM unit, such as JSM unit 305, as the JSM unit dynamically adjusts slice sizes in a single TP situation.

Operations 900 may begin with the JSM unit determining a weight for each slice (block 905). The weights for each slice may be determined by optimizing the rates of the slices, for example. As an illustrative example, optimizing the rates of the slices may be achieved by maximizing a utility function of the rates. However, it may also be possible to optimize the rates of the slices by minimizing a different utility function of the rates. For discussion purposes, let W be the set of packet flows, I be the index set of video services (corresponding to short duration videos and long duration videos), and generic index i. Any given packet flow $w \in W$ belongs to a given slice $S_i$. Furthermore, assume that each packet flow w is comprised of many packets p, $R_{S_i}$ is the instantaneous achievable rate (in bits per second) on slice $S_i$, and each slice requires bandwidth provisioning. Additionally, QoE is a function of video quality and takes on values between 0 and 1. A practical definition for QoE may be the penalty metric $P_w$ discussed previously.

For a given time step δ, the maximization of the utilities may be expressed mathematically as:

$$\max \Sigma_{i \in I} U(R_{S_i}),$$

where U( ) is a utility function. Examples of utility functions may include proportional fairness, weighted fair queuing, and the like. The maximization of the utilities may be subject to:

$$R_{S_i} \geq R_{S_i}^{th} \ i \in I, \quad (1)$$

$$\Sigma_i R_{S_i} \leq R \ i \in I, \quad (2)$$

$$P_{IP_i} \geq P_{B_i} \ i \in I, \quad (3)$$

$$\overline{QoE_{S_i}} \geq QoE_{S_i}^{min} \ I \in I, \quad (4)$$

where Equation (1) expresses a condition that the rate assigned to each slice is at least equal to a reserved rate for each slice ($R_{S_i}^{th}$ may be selected so that $R_{S_i}^{th} = R_{S_i}^{min} \min \{1, P_i/\overline{QoE_{S_i}}\}$, where $R_{S_i}^{min} = \min\{R_{S_i}, \overline{R_{S_i}}\}$, $\overline{R_{S_i}}$ is the average slice rate taken over n time steps, and $P_i = P_{B_i}/P_{IP_i}$); Equation (2) ensures that the total assigned rate has to be smaller than the total available rate R; Equation (3) ensures that the dropping probability of important packets $(1 - P_{IP})$ is smaller than the dropping probability of unimportant packets $(1 - P_B)$; and Equation (4) ensures a minimum QoE on all slices, with $\overline{QoE_{S_i}}$ being the average quality of experience for slice $S_i$ taken over n time steps, and $QoE_{S_i}^{min}$ being the minimum acceptable QoE value on each slice.

The utility function may be modeled as a concave function with respect to $R_{S_i}$, so it is convenient to re-express the maximization of utilities as $$\max \Sigma_{i \in I} U(R_{S_i}) = \max \Sigma_{i \in I} R_{S_i}^{th} \log(R_{S_i}).$$

The exponential moving average weight on each slice, $R_{S_i}^{exp}$, may be expressed mathematically as $$R_{S_i}^{exp^t} = \gamma R_{S_i}^t + (1 - \gamma) R_{S_i}^{exp^{t-1}},$$

where index t denotes the time step, the constant parameter γ represents the degree of weighting decrease, which takes values between 0 and 1. The set of weights at every time step may be expressible as $$weight_i = \frac{R_{S_i}^{th}}{R_{S_i}^{exp}},$$

$$i \in I.$$

The JSM unit may normalize the weights ($\Sigma \ weight_i = 1$) (block 910). The JSM unit may determine the capacity of each slice (block 915). As an illustrative example, the capacity of slice i may be expressed as $$capacity_i = weight_i \times R.$$

The JSM device may send packets to the eNB in accordance with slice capacities (block 920).

Figure 10:
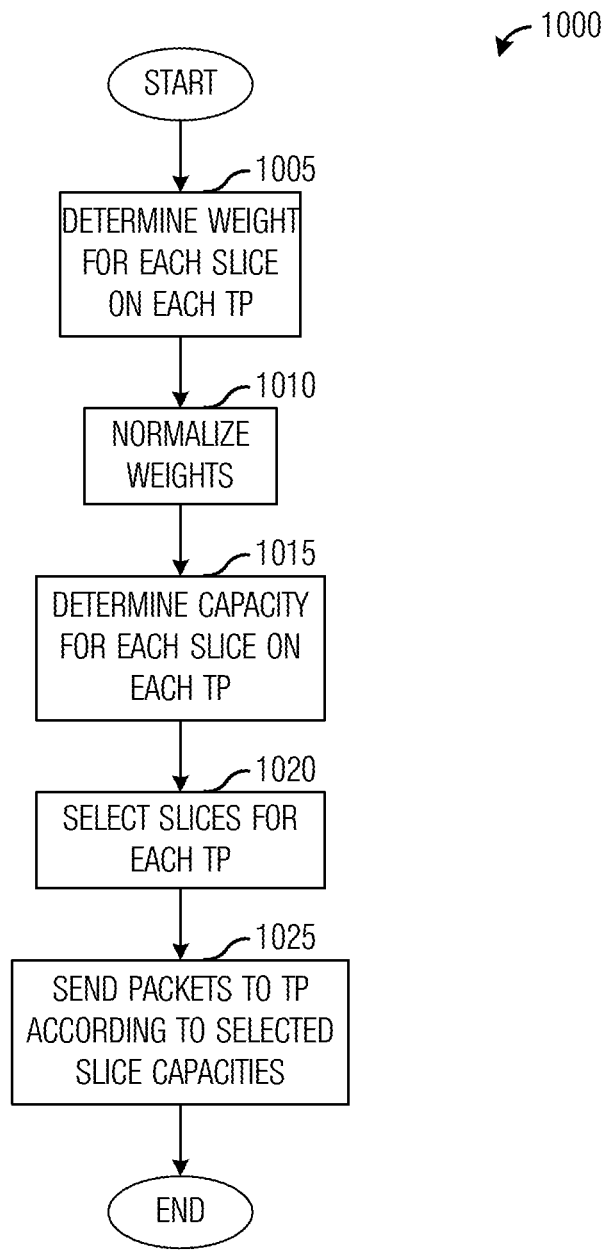
FIG. 10 illustrates a flow diagram of example operations occurring in a JSM unit as the JSM unit jointly performs dynamic slice sizes adjustment and traffic balancing in a multiple eNB situation according to example embodiments described herein.

FIG. 10 illustrates a flow diagram of example operations 1000 occurring in a JSM unit as the JSM unit jointly performs dynamic slice sizes adjustment and traffic balancing in a multiple TP situation. Operations 1000 may be indicative of operations occurring in a JSM unit, such as JSM unit 305, as the JSM unit jointly performs dynamic slice size adjustment and traffic balancing in a multiple TP situation.

Operations 1000 may begin with the JSM unit determining a weight for each slice on each TP (block 1005). The weights for each slice may be determined by optimizing the rates of the slices, for example. As an illustrative example, optimizing the rates of the slices may be achieved by maximizing a utility function of the rates. However, it may also be possible to optimize the rates of the slices by minimizing a different utility function of the rates. In order to generalize to the multiple TP situation, it may be necessary to index quantities with both a slice number ($i \in I$) and a TP number ($n \in N$). Each slice may be virtually split between the multiple TPs so that the rate allocated to slice i is the sum of rates allocated to slice i over all TPs n∈N. The optimization problem (the maximization of the utilities) may be expressed as $$\max \Sigma_{n \in N} \Sigma_{i \in I} U(R_{S_{n,i}})$$

subject to $$R_{S_{n,i}} \geq R_{S_{n,i}}^{th} n \in N, i \in I, \quad (5)$$

$$R_{S_n} \leq R_n n \in N, i \in I, \quad (6)$$

$$\overline{R_{S_n}} \leq R_n/K \; n \in N, i \in I, \quad (7)$$

$$P_{IP_{n,i}} \geq P_{B_{n,i}} n \in N, i \in I, \quad (8)$$

$$\overline{QoE_{S_{n,i}}} \geq QoE_{S_i}^{min} n \in N, i \in I, \quad (9)$$

where Equation (5) expresses the condition that the rate $R_{S_{n,i}}$ assigned to each slice is at least equal to the reserved rate for each slice $R_{S_{n,i}}^{th}$, which should be chosen such that $R_{S_{n,i}}^{th} = R_{S_{n,i}}^{min} \min \{1, P_{n,i}/\overline{QoE_{S_{n,i}}}\}$ and $R_{S_{n,i}}^{min} = \min\{R_{S_{n,i}}, \overline{R_{S_{n,i}}}\}$ where $\overline{R_{S_n}}$ is the average slice rate taken over δ time steps and $P_{n,i} = P_{B_{n,i}}/P_{IP_{n,i}}$; Equation (6) ensures that the total assigned rate is smaller than the total achievable rate on TPn; Equation (7) ensures that the average rate managed by each TP is proportional to the total achievable rate $R_n$, where $R_{S_n} = \Sigma_i R_{S_{n,i}}$, K is a parameter that ensures traffic balancing, and may be chosen at iteration t such that $$K^t = \frac{\overline{R_n^{t-1}}}{\overline{R_{S_n^{t-1}}}},$$

where $\overline{R_n^{t-1}}$ and $\overline{R_{S_n}^{t-1}}$ are averages taken over all TPs; Equation (8) ensures that the dropping probability of important packets $(1-P_{IP})$ is smaller than the dropping probability of unimportant packets $(1-P_B)$; and Equation (9) ensures a minimum QoE in all slices, with $\overline{QoE_{S_{n,i}}}$ as the average quality of experience for slice $S_{n,i}$ and TPn taken over δ time steps, and $QoE_{S_i}^{min}$ being the minimum acceptable QoE value on each slice.

The utility function may be modeled as a concave function with respect to $R_{S_{n,i}}$, so it is convenient to re-express the maximization of utilities as $$\max \Sigma_{n \in N} \Sigma_{i \in I} U(R_{S_{n,i}}) = \max \Sigma_{n \in N} \Sigma_{i \in I} R_{S_{n,i}}^{th} \log(R_{S_{n,i}}).$$

The exponential moving average weight on each slice, $R_{S_{n,i}}^{exp}$, may be expressed mathematically as $$R_{S_{n,i}}^{Exp^t} = \gamma R_{S_{n,i}}^t + (1-\gamma) R_{S_{n,i}}^{exp^{t-1}},$$

where index t denotes the time step, the constant parameter γ represents the degree of weighting decrease, which takes values between 0 and 1. The set of weights at every time step may be expressible as $$\text{weight}_{n,i} = \frac{R_{S_{n,i}}^{th}}{R_{S_{n,i}}^{exp}}, n \in N, i \in I.$$

The JSM unit may normalize the weights (Σ weight$_i$=1) (block 1010). The JSM unit may determine the capacity of each slice (block 1015). As an illustrative example, the capacity of slice i may be expressed as $$\text{capacity}_{n,i} = \text{weight}_{n,i} \times R_n.$$

The JSM unit may select slices for each TP (block 1020). As an example, the JSM device may select the slices by determining $$R_{S_n} = \frac{R_n}{k} \times R_n.$$

the JSM device may send packets to the TP in accordance with slice capacities (block 1025).

Although the present disclosure and its advantages have been described in detail, it should be understood that various changes, substitutions and alterations can be made herein without departing from the spirit and scope of the disclosure as defined by the appended claims.

What is claimed is:

1. A communications controller comprising:
    a flow manager in a control plane, the flow manager configured to classify a packet flow serviced by a plurality of transmission points (TPs) as one of a plurality of slices in accordance with at least one of a nature of the packet flow, a load status of each of the plurality of slices, and feedback information provided by the plurality of TPs, the feedback information indicating a capacity and an average served rate of each of the plurality of TPs, the flow manager further configured to alter a classification of the packet flow in accordance with the load status of each of the plurality of slices and in accordance with the feedback information provided by the plurality of TPs;
    a memory in a data plane operatively coupled to the flow manager, the memory configured to store a packet of the packet flow in one of a plurality of packet queues in accordance with the classification of the packet flow; and
    a scheduler in the control plane operatively coupled to the flow manager and to the memory, the scheduler configured to determine decision metric values associated with each of the plurality of TPs according to the capacity and the average served rate of each of the plurality of TPs, the scheduler further configured to select one or more selected TPs from the plurality of TPs with a greater decision metric value than others of the plurality of TPs, the one or more selected TPs further selected in accordance with a destination of the packet, the scheduler further configured to allocate resources for the plurality of slices, the resources used by the one or more selected TPs to transfer the packet to the destination, the resources including time domain and frequency domain resources, the scheduler further configured to schedule a transfer of the packet from the one of the plurality of packet queues to the one or more selected TPs over the data plane.

2. The communications controller of claim 1, wherein the scheduler is further configured to schedule the transfer of the packet from the one of the plurality of packet queues to the one or more selected TPs in accordance with the classification of the packet flow.

3. The communications controller of claim 2, wherein the scheduler is configured to adjust buffer sizes of the plurality of packet queues in accordance with an optimization of rates of the plurality of slices.

4. The communications controller of claim 3, wherein the scheduler is configured to maximize a utility function of the rates of the plurality of slices.

5. The communications controller of claim 4, wherein the utility function is a concave function with respect to the rates of the plurality of slices.

6. The communications controller of claim 1, wherein the flow manager is configured to initially classify the packet flow as a first slice of the plurality of slices, and wherein the flow manager is configured to subsequently reclassify the packet flow as the one of the plurality of slices in accordance with at least one of the nature of the packet flow, the load status of each of the plurality of slices, and feedback information provided by the plurality of TPs.

7. The communications controller of claim 6, wherein the packet flow comprises a video flow, wherein the plurality of slices comprises a transit slice, a limbo slice, and a steady slice, wherein the first slice is the transit slice, and wherein the transit slice and the steady slice have a higher priority than the limbo slice.

8. The communications controller of claim 6, wherein the flow manager is configured to subsequently reclassify the packet flow in accordance with a penalty metric associated with the packet flow, the penalty metric being a function of a bit rate of the packet flow and an average delay of the packet flow.

9. The communications controller of claim 6, wherein the flow manager is configured to subsequently reclassify the packet flow in accordance with a delay associated with the packet of the packet flow.

10. The communications controller of claim 1, wherein the scheduler is further configured to schedule a transfer of the packet from the one of the plurality of packet queues to the one or more selected TPs over the data plane by:
dequeuing the packet from the one of the plurality of packet queues such that the resources used to schedule packets from each of the plurality of packet queues maintains a predetermined ratio.

11. A method for operating a communications controller, the method comprising:
receiving, by a data plane of the communications controller, a packet of a packet flow serviced by a plurality of transmission points (TPs) controlled by the communications controller;
classifying, by a control plane of the communications controller, the packet flow as one of a plurality of slices in accordance with at least one of a nature of the packet flow, a load status of each of the plurality of slices, and feedback information provided by the plurality of TPs, the feedback information indicating a capacity and an average served rate of each of the plurality of TPs;
storing, by the communications controller, the packet in one of a plurality of packet queues in accordance with the classification of the packet flow, the plurality of packet queues in the data plane of the communications controller;
determining, by the communications controller, decision metric values associated with each of the plurality of TPs according to the capacity and the average served rate of each of the plurality of TPs;
selecting, by the communications controller, one or more selected TPs from the plurality of TPs with a greater decision metric value than others of the plurality of TPs, the selected TP further selected in accordance with a destination of the packet;
allocating, by the communications controller, resources for the plurality of slices, the resources used by the one or more selected TPs to transfer the packet to the destination, the resources including time domain and frequency domain resources; and
scheduling, by the communications controller, a transfer of the packet from the one of the plurality of packet queues to the one or more selected TPs over the data plane.

12. The method of claim 11, further comprising altering a classification of the packet flow in accordance with the load status of each of the plurality of slices and in accordance with the feedback information provided by the plurality of TPs.

13. The method of claim 11, wherein the scheduling the transfer of the packet from the one of the plurality of packet queues to the one or more selected TPs comprises further scheduling the transfer of the packet in accordance with the classification of the packet flow.

14. The method of claim 11, further comprising adjusting buffer sizes of the plurality of packet queues in accordance with an optimization of rates of the plurality of slices.

15. The method of claim 14, wherein adjusting the buffer sizes comprises maximize a utility function of the rates of the plurality of slices.

16. The method of claim 11, wherein classifying the packet flow comprises:
initially classifying the packet flow as a first slice of the plurality of slices; and
subsequently reclassifying the packet flow as the one of the plurality of slices in accordance with at least one of the nature of the packet flow, the load status of each of the plurality of slices, and feedback information provided by the plurality of TPs.

17. The method of claim 16, wherein the packet flow comprises a video flow, wherein the plurality of slices comprises a transit slice, a limbo slice, and a steady slice, wherein the first slice is the transit slice, and wherein the transit slice and the steady slice have a higher priority than the limbo slice.

18. The method of claim 16, wherein the packet is reclassified in accordance with one of a penalty metric associated with the packet flow and a delay associated with the packet of the packet flow, the penalty metric being a function of a bit rate of the packet flow and the delay associated with the packet of the packet flow.

19. The method of claim 11, wherein the scheduling the transfer of the packet from the one of the plurality of packet queues to the one or more selected TPs over the data plane comprises:
dequeuing the packet from the one of the plurality of packet queues such that the resources used to schedule packets from each of the plurality of packet queues maintains a predetermined ratio.

20. A communications system comprising:
a plurality of transmission points (TPs) configured to serve user equipments;
a communications controller operatively coupled to the plurality of TPs, the communications controller configured to classify a packet flow serviced by the plurality of TPs as one of a plurality of slices in accordance with at least one of a nature of the packet flow, a load status of each of the plurality of slices, and feedback information provided by the plurality of TPs controlled by the communications controller, the feedback information indicating a capacity and an average served rate of each of the plurality of TPs, to alter a classification of the packet flow in accordance with the load status of each of the plurality of slices and in accordance with feedback information provided by the plurality of TPs, to store a packet of the packet flow in one of a plurality of packet queues in accordance with the classification of the packet flow, to determine decision metric values associated with each of the plurality of TPs according to the capacity and the average served rate of each of the plurality of TPs, and to schedule transmission of the packet to the user equipments with a subset of the plurality of TPs having a greater decision metric value than others of the plurality of TPs, the communications controller comprising:

a control plane configured to classify the packet flow as the one of the plurality of slices in accordance with at least one of the nature of the packet flow, the load status of each of the plurality of slices, and feedback information provided by the plurality of TPs, and to alter the classification of the packet flow in accordance with the load status of each of the plurality of slices, and the feedback information provided by the plurality of TPs; and a data plane operatively coupled to the control plane, the data plane configured to store the packet of the packet flow in the one of the plurality of packet queues in accordance with the classification of the packet flow, the packet flowing through the data plane during the transmission of the packet to the user equipments with the subset of the plurality of TPs.

* * * * *